United States Patent
Brown et al.

(10) Patent No.: US 9,262,344 B2
(45) Date of Patent: Feb. 16, 2016

(54) LOCAL LOCKING IN A BI-DIRECTIONAL SYNCHRONOUS MIRRORING ENVIRONMENT

(71) Applicant: INTERNATIONAL BUSINESS MACHINES CORPORATION, Armonk, NY (US)

(72) Inventors: Theresa M. Brown, Tucson, AZ (US); Nicolas M. Clayton, Warrington (GB); Theodore T. Harris, Jr., Tucson, AZ (US); Gregory E. McBride, Vail, AZ (US); Carol S. Mellgren, Tucson, AZ (US); Warren K. Stanley, Loveland, CO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 149 days.

(21) Appl. No.: 14/109,645

(22) Filed: Dec. 17, 2013

(65) Prior Publication Data

US 2015/0169475 A1    Jun. 18, 2015

(51) Int. Cl.
*G06F 12/00*        (2006.01)
*G06F 12/14*        (2006.01)

(52) U.S. Cl.
CPC .................................. *G06F 12/1466* (2013.01)

(58) Field of Classification Search
CPC ............ G06F 12/1466; G06F 2201/82; G06F 2201/825
See application file for complete search history.

(56) References Cited

U.S. PATENT DOCUMENTS

| 7,047,256 | B2 | 5/2006 | Miki et al. |
| 7,177,866 | B2 | 2/2007 | Holenstein et al. |
| 7,467,169 | B2 | 12/2008 | Gole et al. |
| 2009/0037679 | A1* | 2/2009 | Kaushik et al. ............... 711/162 |

FOREIGN PATENT DOCUMENTS

EP       1 612 702       1/2006

OTHER PUBLICATIONS

U.S. Appl. No. 14/244,662, filed Apr. 3, 2014, entitled "Tertiary Storage Unit Management in Bidirectional Data Copying", by Theresa M. Brown et al., 47 pp. (18.512).

* cited by examiner

*Primary Examiner* — Aracelis Ruiz
(74) *Attorney, Agent, or Firm* — Janaki K. Davda; Konrad Raynes Davda & Victor LLP

(57) ABSTRACT

Provided are techniques for local locking in a bi-directional synchronous mirroring environment. In response to receiving a write operation for a block of data on a first volume, a lock is obtained on a corresponding block of data on a second volume to obtain exclusive access to that block of data on the second volume. in response to determining that an active write indicator is set to indicate that there is not an active write on the second volume, updated data for the corresponding block of data is written to cache for the second volume, the lock is released to remove exclusive access to the corresponding block of data on the second volume, and a transfer complete message is sent to the first volume.

15 Claims, 7 Drawing Sheets

LOCAL LOCKING IN A BI-DIRECTIONAL SYNCHRONOUS MIRRORING ENVIRONMENT

FIELD

Embodiments of the invention relate to local locking in a bi-directional synchronous mirroring environment.

BACKGROUND

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of various types of media (e.g., hard disk drives, otherwise referred to as a Direct Access Storage Device (DASD), solid state disks, flash memory, etc.). Hosts may communicate Input/Output (I/O) requests to the storage space through the storage controller.

Writes may update data, write new data, or write the same data again. To assist in recovery of data writes, a copy of data may be provided at a remote location. Such copies may also be referred to as dual or shadow copies.

Remote mirroring systems provide techniques for mirroring data in order to facilitate recovery after a system failure. Such data shadowing systems can also provide an additional remote copy for non-recovery purposes, such as local access at a remote site.

In remote mirroring systems, data is maintained in volume pairs. A volume pair includes a volume in a primary storage device and a corresponding volume in a secondary storage device that includes a copy of the data maintained in the primary volume.

Single direction synchronous mirror technology has the target volume write disabled to ensure that the target volume has the same data as the source volume. Allowing synchronous mirroring in both directions means that both the source volume and the target volume may be enabled for writes originating at that volume. That is that both volumes would be both a source volume and a target volume. Thus, both volumes continue to be a mirror image of each other.

An application program may attempt to write at the same location and the same time on both volumes. This case is called a "collision".

With the advent of newer applications that coordinate themselves to partition volumes themselves to prevent collisions and/or handle the reject of a write internally, the likelihood of collisions is less and the consequences are less severe for those applications that are coded to handle and re-drive writes when a collision occurs.

SUMMARY

Provided are a computer program product, system, and method for local locking in a bi-directional synchronous mirroring environment. In response to receiving a write operation for a block of data on a first volume, a lock is obtained on a corresponding block of data on a second volume to obtain exclusive access to that block of data on the second volume. In response to determining that an active write indicator is set to indicate that there is not an active write on the second volume, updated data for the corresponding block of data is written to cache for the second volume, the lock is released to remove exclusive access to the corresponding block of data on the second volume, and a transfer complete message is sent to the first volume.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide an efficient way to indicate to the application program that the same area is also being written on the other volume at the same time. When the application program is notified, the application program can respond to the notification in various manners (e.g., rejecting one or both of the writes).

Figure 1:
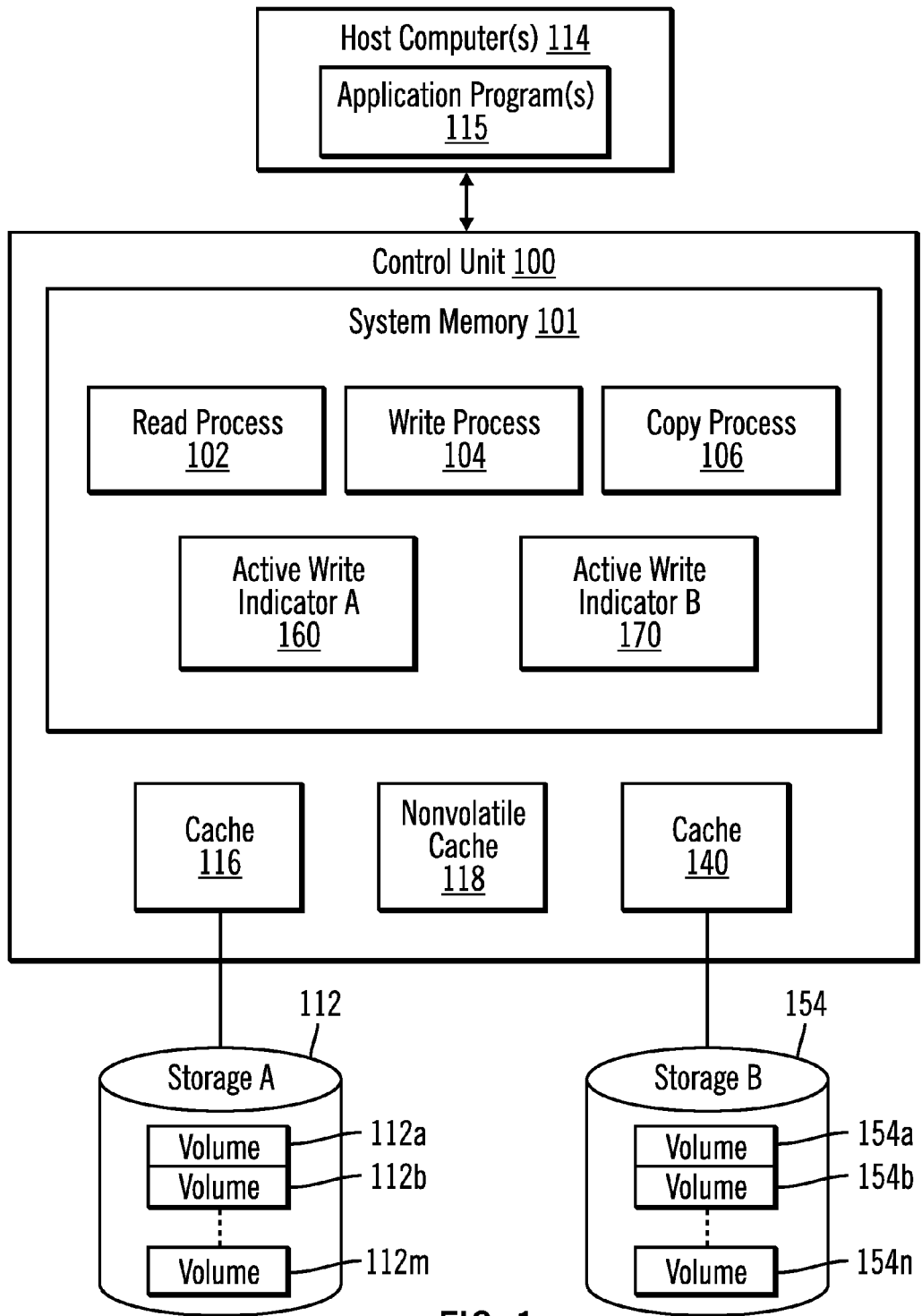
FIG. 1 illustrates, in a block diagram, a computing environment in accordance with certain embodiments of the invention.

FIG. 1 illustrates, in a block diagram, a computing environment in accordance with certain embodiments of the invention. A control unit 100 provides one or more host computers 114 access to storage A 112 and storage B 154. In certain embodiments, storage A 112 and storage B 154 are in a bi-directional synchronous mirroring environment. Thus, storage B 154 maintains back-up copies of all or a subset of the volumes of the storage A 112, and storage A 112 maintains back-up copies of all or a subset of the volumes of the storage B 154.

The host computers 114 may each execute one or more application programs 115 under control of an operating system (not shown) and executing on a Central Processing Unit (CPU) (not shown). The control unit 100 receives Input/Output (I/O) requests from the one or more application programs 115 at one or more host computers 114 (e.g., over a network) directed toward storage A 112 and/or storage B 154. Storage A 112 is configured to have volumes (e.g., Logical Unit Numbers, Logical Devices, etc.) 112a,b, . . . m, where m represents that there may be any number of volumes. Storage B 154 is configured to have volumes (e.g., Logical Unit Numbers, Logical Devices, etc.) 154a,b . . . n, where n represents that there may be any number of volumes.

Figure 2:
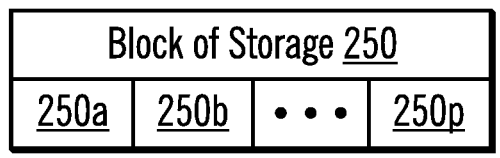
FIG. 2 illustrates blocks of storage in accordance with certain embodiments of the invention.

FIG. 2 illustrates blocks of storage in accordance with certain embodiments of the invention. The storage A 112 and the storage B 154 may each be divided into blocks of storage 250 (FIG. 2) containing blocks of data, and the blocks of storage 250 are further divided into sub-blocks of storage (250a-250p, where p represents that there may be any number of sub-blocks) that contain sub-blocks of data. In certain embodiments, the blocks of data are contents of tracks, while the sub-blocks of data are contents of sectors of tracks. A volume may be any logical or physical element of storage. In certain embodiments, the blocks of data are contents of tracks, while the sub-blocks of data are contents of sectors of tracks.

The control unit 100 includes a cache 116 in which updates to blocks of data in the storage A 112 are maintained until written to storage A 112 (i.e., the blocks of data are destaged). The control unit 100 includes a cache 140 in which updates to blocks of data in the storage B 154 may be maintained until written to storage B 154 (i.e., the blocks of data are destaged). The system memory 101 may be in a separate memory devices from caches 116, 140 or may share a memory device with cache 116 and/or 140.

Additionally, the control unit 100 includes a nonvolatile cache 118. The non-volatile cache 118 may be, for example, a battery-backed up volatile memory, to maintain a non-volatile copy of data updates and other information.

The control unit 100 includes system memory 101 in which a read process 102 for reading data, and a write process 104 for writing data reside. The system memory 101 includes an active write indicator A 160 for storage A 112 and an active write indicator B 170 for storage B.

The system memory 101 may also include a copy process 106. In certain embodiments, the copy process 106 performs a point-in-time copy. In certain embodiments, the copy process performs an instant virtual copy.

A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "Instant Virtual Copy" (IVC) operations, also referred to as "fast replicate functions." Instant virtual copy operations work by modifying metadata in structures, such as relationship tables or pointers, to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the control unit receives updates to the original or copy, the updates are stored separately and cross-referenced to the updated data object only. At this point, the original and copy data objects begin to diverge. The initial benefit is that the IVC occurs almost instantaneously, completing much faster than a normal physical copy operation. This frees the host and storage subsystem to perform other tasks. The host or storage subsystem may even proceed to create an actual, physical copy of the original data object during background processing, or at another time.

The cache 116 and cache 140 may comprise separate memory devices or different sections of a same memory device. The cache 116 and cache 140 may be used to buffer read and write data being transmitted between the hosts 114, storage A 112, and storage B 154. Further, caches 118 and 140 may be referred to as source and target caches for holding source or target blocks of data in an copy relationship, and the caches 118 and 140 may store at the same time source and target blocks of data in different copy relationships.

In certain embodiments, removable storage (instead of or in addition to remote storage, such as storage B 154) may be used to maintain back-up copies of all or a subset of the storage A 112, and the techniques of the invention transfer data to the removable storage rather than to the remote storage. The removable storage may reside at the control unit 100.

In certain embodiments, the control unit 100 may be comprised of any control unit known in the art. In certain embodiments storage A 112 and storage B 154 are coupled to different control units that are able to communicate with each other.

In certain embodiments, the host computers 114 and the control unit 100 may comprise any computing device known in the art, such as a mainframe, server, personal computer, workstation, laptop, handheld computer, telephony device, network appliance, virtualization device, storage controller, etc.

In certain embodiments, data is maintained in volume pairs. A volume pair is comprised of a first volume in a first storage device (e.g., storage A 112) and a corresponding volume in a second storage device (e.g., storage B 154) that includes a consistent copy of the data maintained in the first volume. For example, volume 112a at storage A 112 may correspond to volume 154a at storage B 154.

For storage 112, 154, the values of m and n may be the same or different. The storage 112, 154 may each comprise an array of storage devices, such as Direct Access Storage Devices (DASDs), Just a Bunch of Disks (JBOD), Redundant Array of Independent Disks (RAID), virtualization device, etc.

For ease of reference, the terms tracks and sectors may be used herein as examples of blocks of data and sub-blocks of data, but use of these terms is not meant to limit the technique of the invention to tracks and sectors. The techniques of the invention are applicable to any type of storage, block of storage or block of data divided in any manner.

For ease of reference, a block of data in source storage may be referred to as a "source block of data," and a block of data in target storage may be referred to as a "target block of data."

When the indication of which storage is to be a source and which storage is to be a target is reversed, for ease of reference, the "original source" may be referred to as a "new target", the "original target" may be referred to as a "new source", an "original source block of data" may be referred to as a "new target block of data," and an "original target block of data" may be referred to as a "new source block of data."

In a synchronous mirroring environment, in which changes to both storage A 112 and storage B 154 are allowed, the application program 115 and the storage system need to know what writes are to be completed on volumes of both storage A 112 and storage B 154 such that corresponding volumes are in synch. If there is a collision, the application program 115 is notified by a combination of the write process 104 and the copy process 106 so that the application program 115 can re-drive the write as the application program 115 desires. In certain embodiments, the write process 104 interacts with the application program 115 at the host computer 114, while the copy process 106 is aware of the collision.

Figure 3:
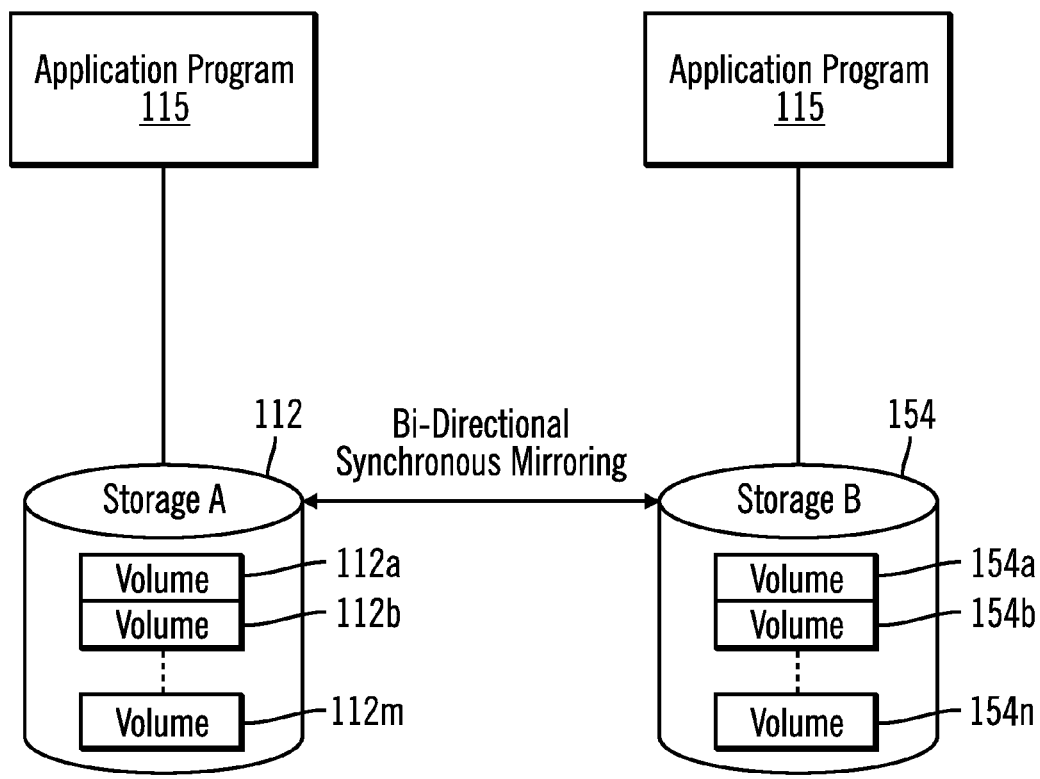
FIG. 3 illustrates an example in which storage A and storage B are updated at a same time in accordance with certain embodiments.

FIG. 3 illustrates an example in which storage A 112 and storage B 154 are updated at a same time in accordance with certain embodiments. In certain embodiments, the two applications programs 115 are a same application program. In certain embodiments, the two application programs 115 are different application programs. With embodiments, each application program 115 is informed of a collision such that the application program 115 is able to handle processing as that application program deems necessary for a collision. With embodiments, this is done without negotiating a lock on volumes (as this would cause a large performance penalty).

Figure 4A:
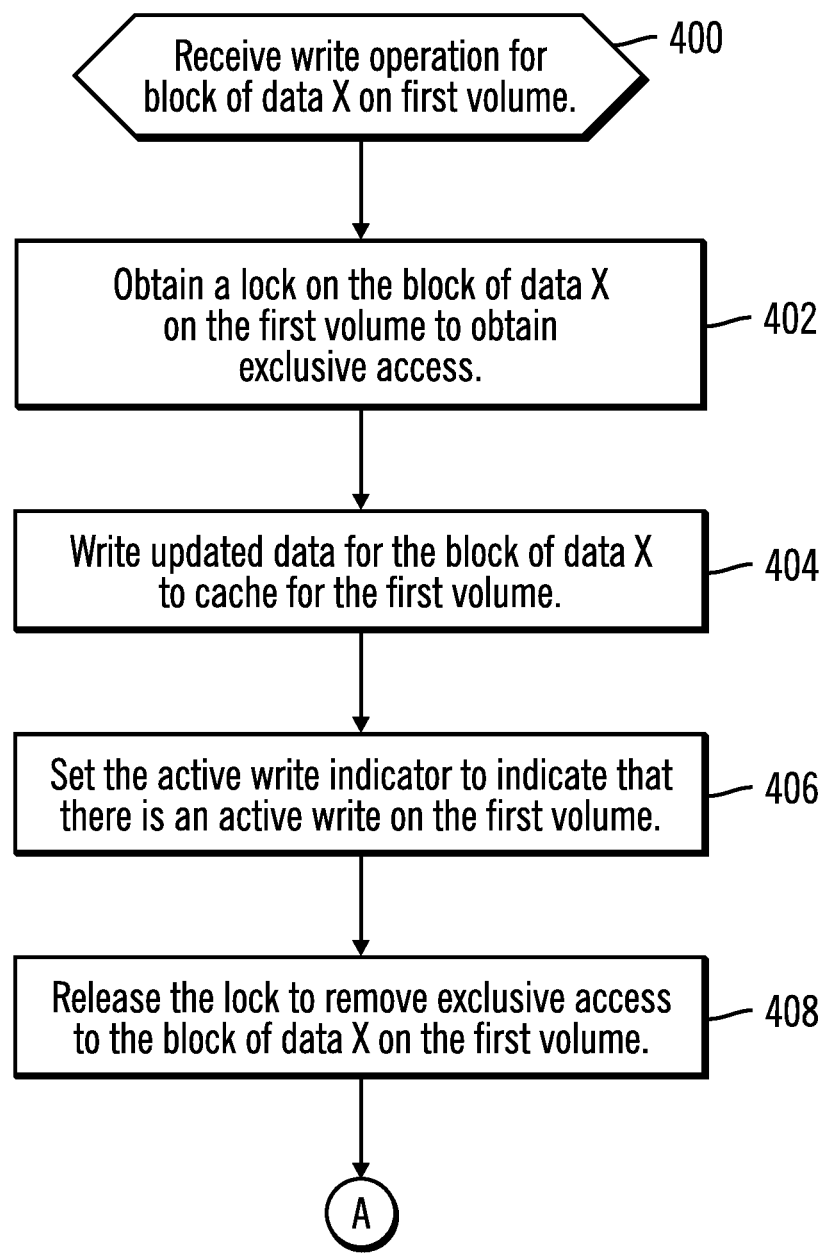
FIGS. 4A, 4B, and 4C illustrate, in a flow diagram, operations for detecting a collision and notifying an application program of the collision in accordance with certain embodiments.
Figure 4B:
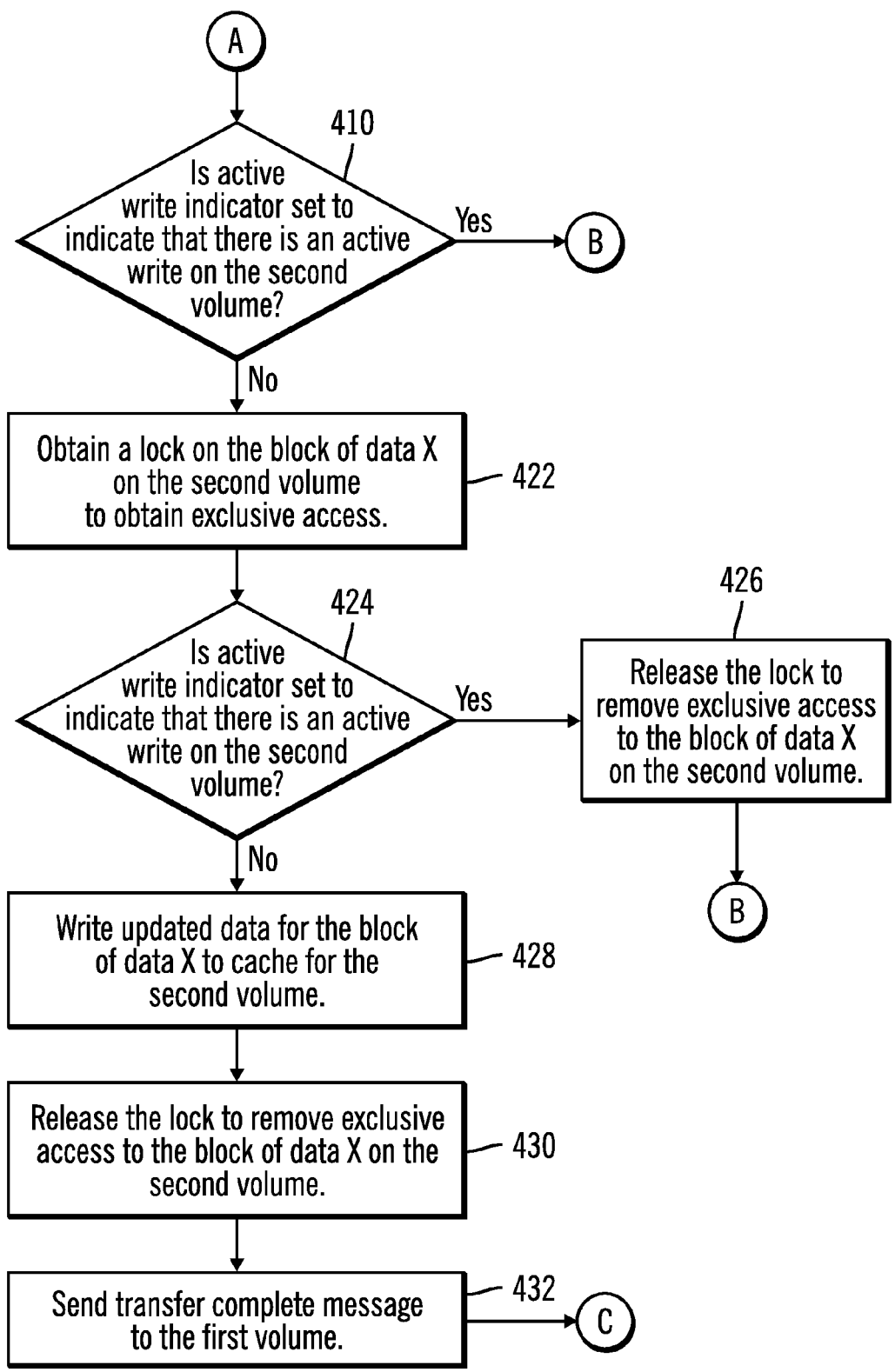
Figure 4C:
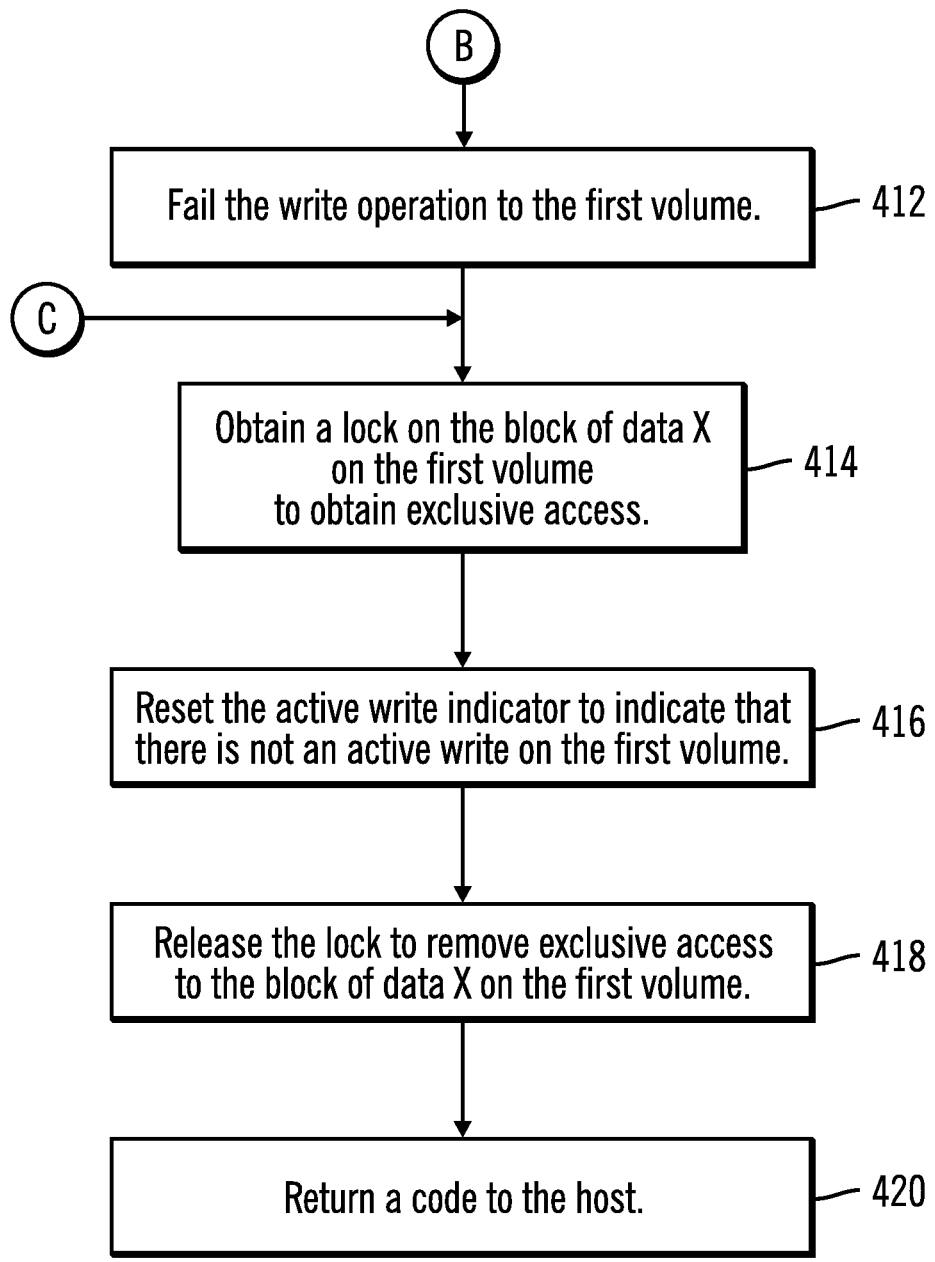

FIGS. 4A, 4B, and 4C illustrate, in a flow diagram, operations for detecting a collision and notifying an application program of the collision in accordance with certain embodiments. FIGS. 4A, 4B, and 4C refer to a first volume and a second volume. When a volume of storage A 112 is the first volume, then the second volume refers to a corresponding second volume of storage B 154. When a volume of storage B 154 is the first volume, then the second volume refers to a corresponding second volume of storage A 112. In certain embodiments, the first volume is a "local" volume, while the second volume is a "remote" volume.

Also, blocks 400-408 describe writing the block of data on the first volume. Blocks 410-432 describe the transfer of the block of data to the second volume. In particular, blocks 414-418 describe cleanup on the first volume.

Control begins at block 400 with the write process 104 receiving a write operation for a block of data X (e.g., a track) on a first volume. In block 402, the write process 104 obtains a lock on the block of data X on the first volume to obtain exclusive access to that block of data X on the first volume. In block 404, the write process 104 writes updated data for the block of data X to cache for the first volume. In block 406, the write process 104 sets (e.g., sets to true) the active write indicator to indicate that there is an active write on the first volume. In block 408, the write process 104 releases the lock to remove exclusive access to the block of data X on the first volume. From block 408 (FIG. 4A), processing continues to block 410 (FIG. 4B).

In block 410, the write process 104 determines whether the active write indicator is set to indicate that there is an active write on the second volume. If so, processing goes to block 412 (FIG. 4C), otherwise, processing continues to block 422.

In block 412, the write process 104 fails the write operation to the first volume. In block 414, the write process 104 obtains a lock on the block of data X on the first volume to obtain exclusive access to that block of data X on the first volume. In block 416, the write process 104 resets (e.g., sets to false) the active write indicator to indicate that there is not an active write on the first volume. In block 418, the write process 104 releases the lock to remove exclusive access to the block of data X on the first volume. In this case, the lock is needed while changing the state of the active write indicator. In block 420, the write process 104 returns a code to the host 114. Block 420 may be reached in cases where the write on the second volume is successful or had failed, and the code may indicate success or failure. If the code indicates failure of the write on the second volume, a reason for the failure may be provided, and the host 114 may re-drive the command based on the reason.

In block 422, the write process 104 obtains a lock on the block of data X on the second volume to obtain exclusive access to that block of data X on the second volume. In block 424, the write process 104 determines whether the active write indicator is set to indicate that there is an active write on the second volume. If so, processing goes to block 426 (FIG. 4C), otherwise, processing continues to block 428 (FIG. 4B).

In block 426, the write process 104 releases the lock to remove exclusive access to the block of data X on the second volume. From block 426 (FIG. 4B), processing continues to block 412 (FIG. 4C).

In block 428, the write process 104 writes updated data for the block of data X to cache for the second volume. In block 430, the write process 104 releases the lock to remove exclusive access to the block of data X on the second volume. In block 432, the write process 104 sends transfer complete message to the first volume. From block 432, processing continues to block 414.

In certain embodiments, locking takes place on the local volume where the write is received, but the write is not failed until the corresponding write is attempted on the remote volume. In certain embodiments, it is possible that both writes to the first volume and the second volume are failed because the active write indicator may be set when each storage system attempts to do the remote write. In certain embodiments, this enables the application program writing to the first volume and the application program writing to the second volume to understand that they are attempting to write to the same area at the same time.

With embodiments, the writing of overlapping data is detected in real time and handled with the queuing of the write on the second storage or rejecting the write, which is sent back to the first storage for retry.

Thus, for storage with synchronous mirroring with possibility of write collision, embodiments resolve any collision by rejecting one or both writes.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 5:
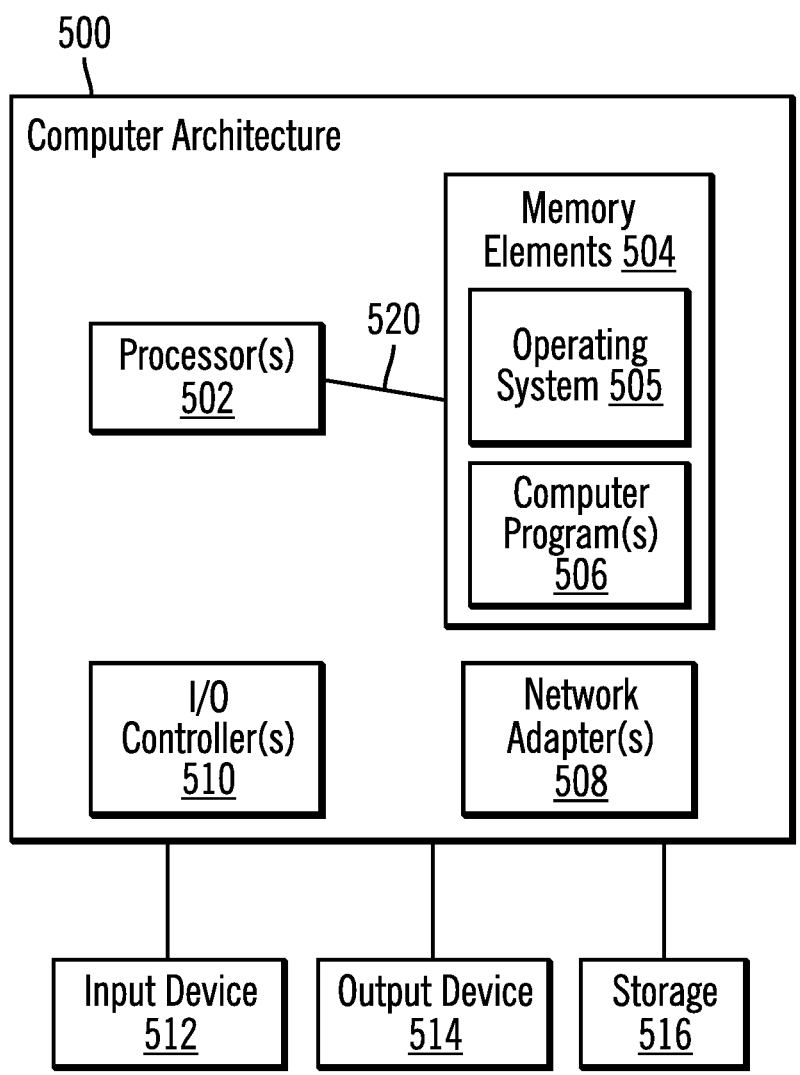
FIG. 5 illustrates, in a block diagram, a computer architecture that may be used in accordance with certain embodiments.

FIG. 5 illustrates a computer architecture 500 that may be used in accordance with certain embodiments. In certain embodiments, computing device host computers 114 and/or control unit 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer program product, the computer program product comprising a non-transitory computer readable storage medium having program code embodied therewith, the program code executable by at least one processor to perform:

in response to receiving a write operation for a block of data on a first volume,
obtaining a lock on a corresponding block of data on a second volume to obtain exclusive access to that block of data on the second volume; and in response to determining that an active write indicator is set to indicate that there is not an active write on the second volume,
writing updated data for the corresponding block of data to cache for the second volume;
releasing the lock to remove exclusive access to the corresponding block of data on the second volume; and
sending a transfer complete message to the first volume.

2. The computer program product of claim 1, wherein the program code is executable by at least one processor to perform:

obtaining a lock on the block of data on the first volume;
writing updated data for the block of data to cache for the first volume;
setting an active write indicator to indicate that there is an active write on the first volume; and
releasing the lock to remove exclusive access to the block of data on the first volume.

3. The computer program product of claim 1, wherein the program code is executable by at least one processor to perform:

in response to determining that the active write indicator is set to indicate that there is an active write on the second volume before obtaining the lock on the corresponding block of data on the second volume, failing the write operation to the first volume.

4. The computer program product of claim 1, wherein the program code is executable by at least one processor to perform:

in response to determining that the active write indicator is set to indicate that there is an active write on the second volume after obtaining the lock on the corresponding block of data on the second volume,
releasing the lock to remove exclusive access to the corresponding block of data on the second volume; and
failing the write operation to the first volume.

5. The computer program product of claim 1, wherein the program code is executable by at least one processor to perform:
- obtaining a lock on the block of data on the first volume;
- resetting the active write indicator on the first volume; and
- releasing the lock to remove exclusive access to the block of data on the first volume.

6. A method, comprising:
- in response to receiving a write operation for a block of data on a first volume,
  - obtaining, with a processor of a computer, a lock on a corresponding block of data on a second volume to obtain exclusive access to that block of data on the second volume; and
- in response to determining that an active write indicator is set to indicate that there is not an active write on the second volume,
  - writing updated data for the corresponding block of data to cache for the second volume;
  - releasing the lock to remove exclusive access to the corresponding block of data on the second volume; and
  - sending a transfer complete message to the first volume.

7. The method of claim 6, further comprising:
- obtaining a lock on the block of data on the first volume;
- writing updated data for the block of data to cache for the first volume;
- setting an active write indicator to indicate that there is an active write on the first volume; and
- releasing the lock to remove exclusive access to the block of data on the first volume.

8. The method of claim 6, further comprising:
- in response to determining that the active write indicator is set to indicate that there is an active write on the second volume before obtaining the lock on the corresponding block of data on the second volume, failing the write operation to the first volume.

9. The method of claim 6, further comprising:
- in response to determining that the active write indicator is set to indicate that there is an active write on the second volume after obtaining the lock on the corresponding block of data on the second volume,
  - releasing the lock to remove exclusive access to the corresponding block of data on the second volume; and
  - failing the write operation to the first volume.

10. The method of claim 6, further comprising:
- obtaining a lock on the block of data on the first volume;
- resetting the active write indicator on the first volume; and
- releasing the lock to remove exclusive access to the block of data on the first volume.

11. A computer system, comprising:
- one or more processors, one or more computer-readable memories and one or more computer-readable, tangible storage devices; and
- program instructions, stored on at least one of the one or more computer-readable, tangible storage devices for execution by at least one of the one or more processors via at least one of the one or more memories, to perform operations, the operations comprising:
  - in response to receiving a write operation for a block of data on a first volume,
    - obtaining a lock on a corresponding block of data on a second volume to obtain exclusive access to that block of data on the second volume; and
  - in response to determining that an active write indicator is set to indicate that there is not an active write on the second volume,
    - writing updated data for the corresponding block of data to cache for the second volume;
    - releasing the lock to remove exclusive access to the corresponding block of data on the second volume; and
    - sending a transfer complete message to the first volume.

12. The computer system of claim 11, wherein the operations further comprise:
- obtaining a lock on the block of data on the first volume;
- writing updated data for the block of data to cache for the first volume;
- setting an active write indicator to indicate that there is an active write on the first volume; and
- releasing the lock to remove exclusive access to the block of data on the first volume.

13. The computer system of claim 11, wherein the operations further comprise:
- in response to determining that the active write indicator is set to indicate that there is an active write on the second volume before obtaining the lock on the corresponding block of data on the second volume, failing the write operation to the first volume.

14. The computer system of claim 11, wherein the operations further comprise:
- in response to determining that the active write indicator is set to indicate that there is an active write on the second volume after obtaining the lock on the corresponding block of data on the second volume,
  - releasing the lock to remove exclusive access to the corresponding block of data on the second volume; and
  - failing the write operation to the first volume.

15. The computer system of claim 11, wherein the operations further comprise:
- obtaining a lock on the block of data on the first volume;
- resetting the active write indicator on the first volume; and
- releasing the lock to remove exclusive access to the block of data on the first volume.

* * * * *